US011543721B2

(12) United States Patent
Sasanuma et al.

(10) Patent No.: US 11,543,721 B2
(45) Date of Patent: *Jan. 3, 2023

(54) DISPLAY DEVICE

(71) Applicant: Japan Display Inc., Tokyo (JP)

(72) Inventors: Keita Sasanuma, Tokyo (JP); Masaki Kajiyama, Tokyo (JP); Kengo Shiragami, Tokyo (JP); Naoyuki Obinata, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/526,242

(22) Filed: Nov. 15, 2021

(65) Prior Publication Data

US 2022/0075234 A1 Mar. 10, 2022

Related U.S. Application Data

(63) Continuation of application No. 16/821,560, filed on Mar. 17, 2020, now Pat. No. 11,175,552.

(30) Foreign Application Priority Data

Mar. 22, 2019 (JP) .............................. JP2019-055274

(51) Int. Cl.
*G02F 1/1362* (2006.01)
*G02F 1/1339* (2006.01)
(52) U.S. Cl.
CPC ...... *G02F 1/136286* (2013.01); *G02F 1/1339* (2013.01)

(58) Field of Classification Search
CPC ............ G02F 1/1345; G02F 1/133452; G02F 1/13458; G02F 1/13394; G02F 1/1339; G02F 1/133388; G02F 1/136286
See application file for complete search history.

(56) References Cited

U.S. PATENT DOCUMENTS 4,422,731 A    12/1983 Droguet et al.
11,175,552 B2* 11/2021 Sasanuma ............. G02F 1/1339
(Continued)

FOREIGN PATENT DOCUMENTS

JP    09-073093       3/1997
JP    2007047346      2/2007
JP    2010-237506 A   10/2010

OTHER PUBLICATIONS

Japanese Office Action dated Oct. 25, 2022 in corresponding Japanese Application No. 2019-055274.

*Primary Examiner* — Jessica M Merlin
(74) *Attorney, Agent, or Firm* — K&L Gates LLP

(57) ABSTRACT

Display device is provided and includes first and second substrates; display region in which pixels are provided on first substrate; peripheral region positioned between edge of first substrate and display region; scanning lines extending in first direction; signal lines extending in second direction; terminals arranged in first direction in peripheral region of first substrate; connection lines in first region and that connect terminals and signal lines; dummy electrodes disposed in second region separated from connection lines in planar view, and signal output lines that couple terminals and connection lines, wherein dummy electrodes are provided in second region surrounded by end of first substrate and signal output lines.

19 Claims, 13 Drawing Sheets

(56) References Cited

U.S. PATENT DOCUMENTS

2002/0171800 A1 11/2002 Miyazaki et al.
2008/0002087 A1 1/2008 Kim et al.
2008/0239188 A1 10/2008 Jung et al.

\* cited by examiner

FIG.8
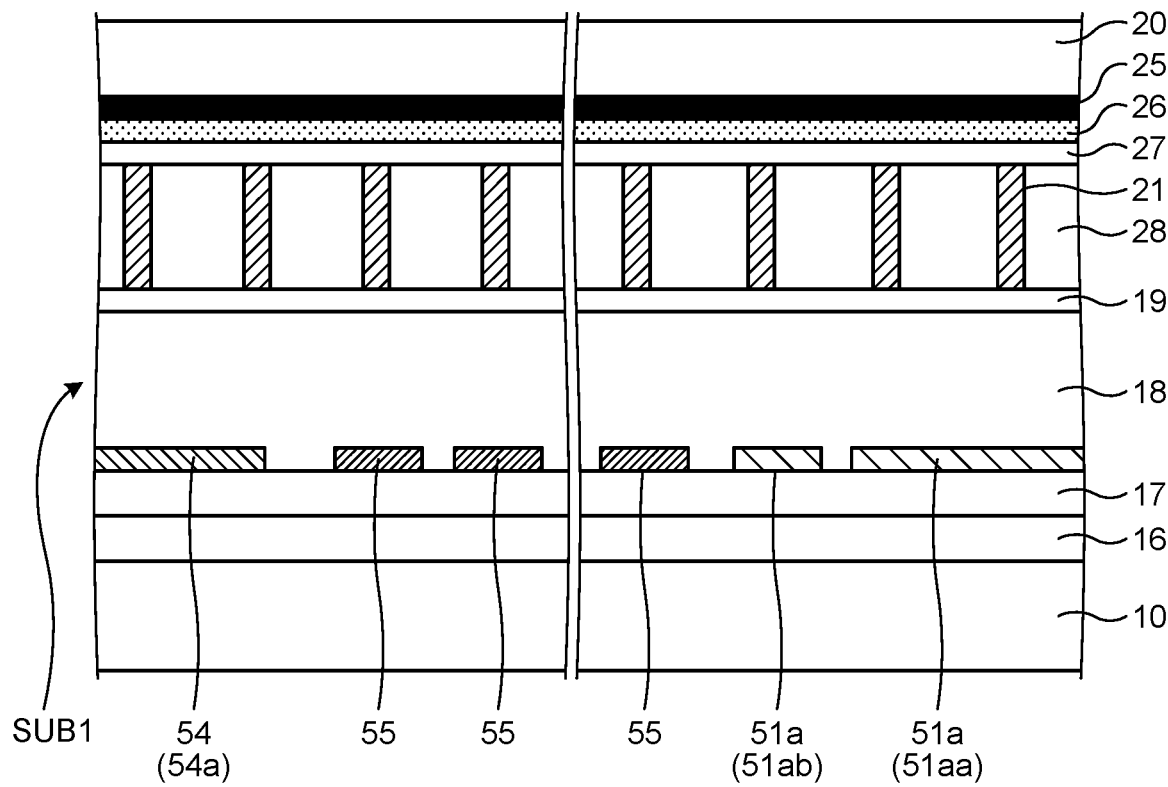
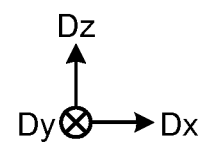

FIG.12
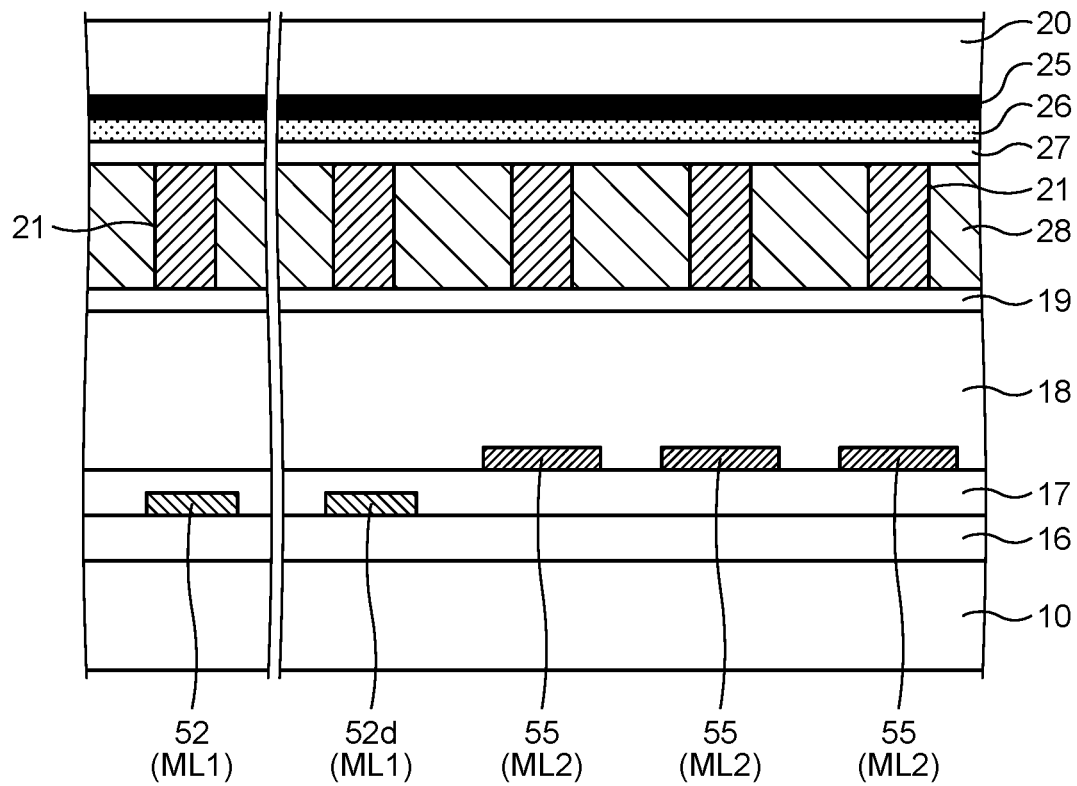
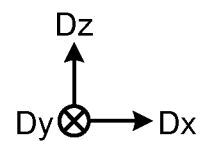

DISPLAY DEVICE

CROSS-REFERENCE TO RELATED APPLICATIONS

This application is a continuation of U.S. patent application Ser. No. 16/821,560, filed Mar. 17, 2020, which claims priority from Japanese Application No. 2019-055274, filed on Mar. 22, 2019, the contents of which are incorporated by reference herein in its entirety.

BACKGROUND

1. Technical Field

The present disclosure relates to a display device.

2. Description of the Related Art

The display device disclosed in Japanese Patent Application Laid-open Publication No. 2010-237506 (JP-A-2010-237506) includes a plurality of columnar spacers between two substrates facing each other. The columnar spacers define the gap between the substrates. While the columnar spacers described in JP-A-2010-237506 are provided in a display region, a plurality of columnar spacers may also be provided in a peripheral region, that is, a region between the display region and the edges of the substrates.

Variation in the cell gap may possibly deteriorate the display performance. A number of wiring lines are provided in a region in the peripheral region provided with terminals coupled to a driver IC, a wiring substrate, and other components. The unevenness between the part provided with the wiring lines and the part provided with no wiring line may possibly cause variation in the cell gap.

SUMMARY

According to an aspect of the present disclosure, a display device includes: a first substrate; a second substrate facing the first substrate; a display region in which a plurality of pixels are provided on the first substrate; a peripheral region positioned between an edge of the first substrate and the display region; a plurality of scanning lines extending in a first direction; a plurality of signal lines extending in a second direction; a plurality of terminals arranged in the first direction in the peripheral region of the first substrate; a plurality of connection lines that connect the terminals and the signal lines; a plurality of spacers provided between the first substrate and the second substrate in a direction perpendicular to the first substrate; and a plurality of dummy electrodes separated from the connection lines in planar view and provided between the first substrate and the spacers in the direction perpendicular to the first substrate.

BRIEF DESCRIPTION OF THE DRAWINGS

FIG. 8 is a sectional view along line VIII-VIII' of FIG. 6;

FIG. 12 is a sectional view along line XII-XII' of FIG. 11; and

DETAILED DESCRIPTION

Figure 1:
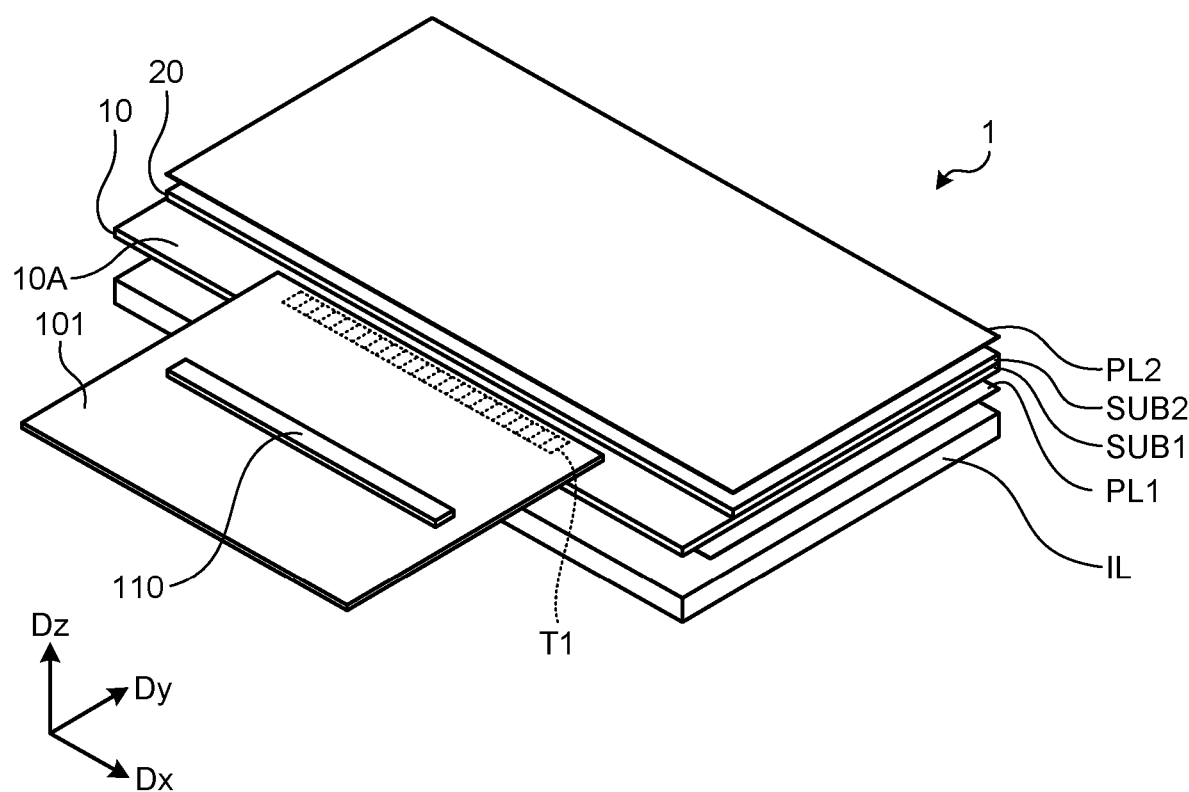
FIG. 1 is a perspective view of a display device according to an embodiment.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate changes made without departing from the spirit of the present disclosure and easily conceivable by those skilled in the art naturally fall within the scope of the disclosure. To simplify the explanation, the drawings may possibly illustrate the width, the thickness, the shape, and other elements of each unit more schematically than the actual aspect. These elements, however, are given by way of example only and are not intended to limit interpretation of the present disclosure. In the present specification and the figures, components similar to those previously described with reference to previous figures are denoted by the same reference numerals, and detailed explanation thereof may be appropriately omitted.

In this disclosure, when an element is described as being "on" another element, the element can be directly on the other element, or there can be one or more elements between the element and the other element.

FIG. 1 is a perspective view of a display device according to an embodiment. As illustrated in FIG. 1, a display device 1 includes an array substrate SUB1, a counter substrate SUB2, a first polarizing plate PL1, a second polarizing plate PL2, and an illumination device IL. These components are layered in a third direction Dz in order of the illumination device IL, the first polarizing plate PL1, the array substrate SUB1, the counter substrate SUB2, and the second polarizing plate PL2.

A first direction Dx according to the present embodiment extends along the long side of the array substrate SUB1. A second direction Dy intersects (or is orthogonal to) the first direction Dx. The directions are not limited thereto, and the second direction Dy may intersect the first direction Dx at an angle other than 90°. A plane defined by the first direction Dx and the second direction Dy is parallel to a surface of the array substrate SUB1. The third direction Dz orthogonal to the first direction Dx and the second direction Dy is the thickness direction of the array substrate SUB1.

The array substrate SUB1 is a drive circuit substrate that drives a plurality of pixels PiX. The array substrate SUB1 includes a first insulating substrate 10 serving as a base. The array substrate SUB1 includes switching elements Tr and various kinds of wiring, such as scanning lines GL and signal lines SL (refer to FIG. 5) provided to the first insulating substrate 10. The counter substrate SUB2 is arranged facing the array substrate SUB1 and includes a second insulating substrate 20 serving as a base. The second insulating substrate 20 is arranged facing the first insulating substrate 10. The first insulating substrate 10 and the second insulating substrate 20 are made of translucent material, such as a glass substrate and a resin substrate. The counter substrate SUB2 includes a color filter CF and a light-shielding layer BM (refer to FIG. 4) provided to the second insulating substrate 20. A liquid crystal layer LC serving as a display element is arranged between the array substrate SUB1 and the counter substrate SUB2.

The length of the array substrate SUB1 in the second direction Dy is longer than that of the counter substrate SUB2 in the second direction Dy. As illustrated in FIG. 1, the first insulating substrate 10 has a protrusion 10A. The protrusion 10A protrudes outside the second insulating substrate 20 in planar view.

A plurality of terminals T1 are disposed on the protrusion 10A. The terminals T1 are arranged in the first direction Dx. The protrusion 10A is provided with a wiring substrate 101. The wiring substrate 101 is made of flexible printed circuits (FPC), for example. The wiring substrate 101 is coupled to the terminals T1 of the first insulating substrate 10 by film on glass (FOG) using an anisotropic conductive film (ACF), for example (hereinafter, referred to as "FOG mounting"). As a result, wiring lines on the first insulating substrate 10 are electrically coupled to wiring lines on the wiring substrate 101.

The wiring substrate 101 is provided with a driver integrated circuit (IC) 110. The driver IC 110 includes a control circuit that controls display on the display device 1, for example. The driver IC 110 is mounted on the wiring substrate 101 by chip on film (COF) using an ACF, for example (hereinafter, referred to as "COF mounting"). The mounting form is not limited thereto, and the driver IC 110 may be mounted on the first insulating substrate 10 by chip on glass (COG) mounting. The driver IC 110 is not necessarily disposed at the position described above and may be disposed on a control substrate or a flexible substrate outside the module, for example.

The array substrate SUB1 faces the illumination device IL, and the counter substrate SUB2 is positioned closer to a display surface. The illumination device IL emits light toward the array substrate SUB1. The illumination device IL may be a side-light backlight or a direct backlight, for example. Various kinds of illuminators can be employed as the illumination device IL, the detailed explanation thereof is omitted.

An optical element including the first polarizing plate PL1 is disposed on an outer surface of the first insulating substrate 10 or a surface facing the illumination device IL. An optical element including the second polarizing plate PL2 is disposed on an outer surface of the second insulating substrate 20 or a surface on the observation position side. A first polarizing axis of the first polarizing plate PL1 and a second polarizing axis of the second polarizing plate PL2 are in a cross-Nicol alignment on the X-Y plane, for example. The optical elements including the first polarizing plate PL1 and the second polarizing plate PL2 may include other optical functional elements, such as a retardation plate.

Figure 2:
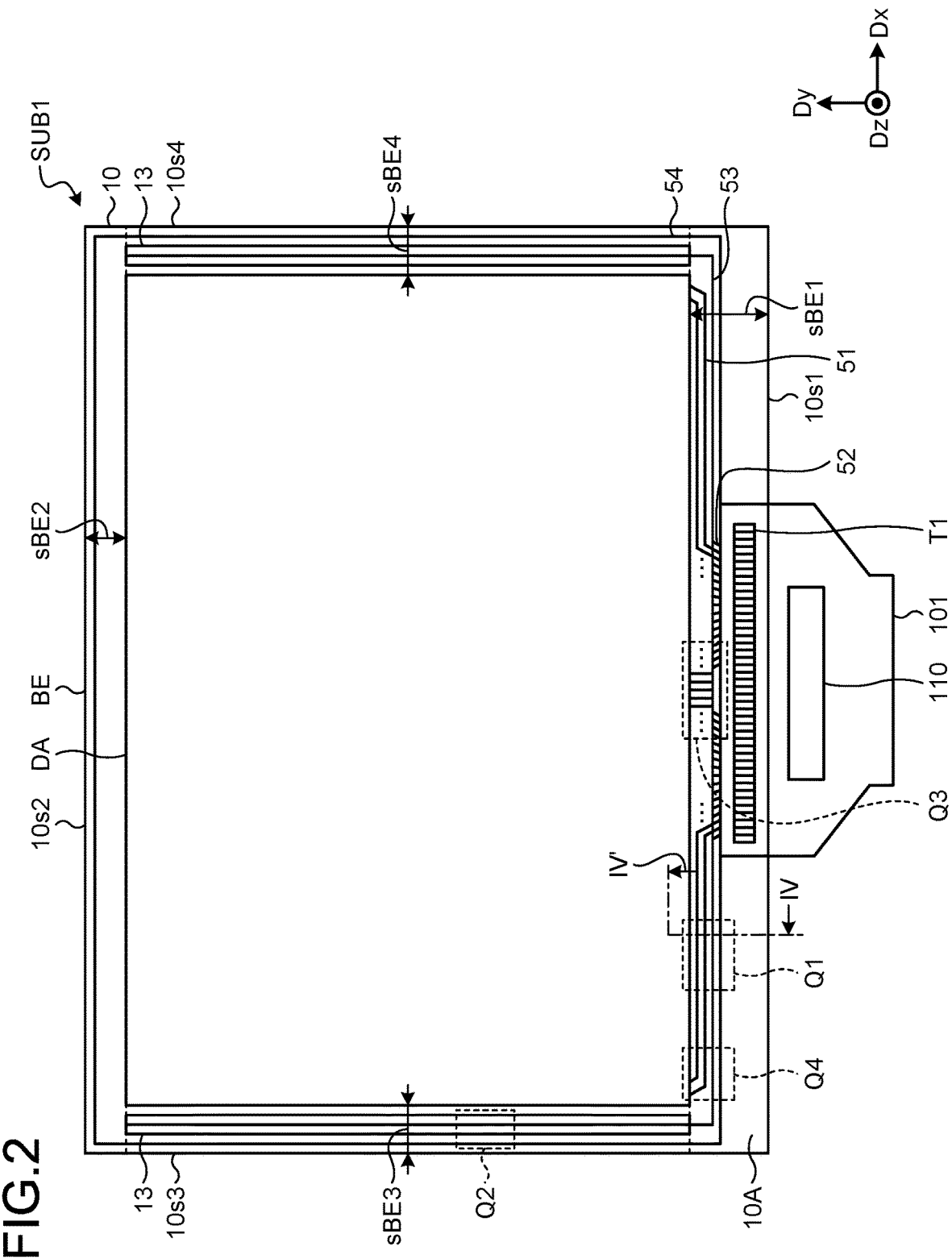
FIG. 2 is a plan view schematically illustrating an array substrate.

FIG. 2 is a plan view schematically illustrating the array substrate. As illustrated in FIG. 2, the display device 1 has a peripheral region BE outside a display region DA. While the display region DA has a rectangular shape, the outer shape of the display region DA is not particularly limited. The display region DA may have a substantially rectangular shape with curved corners or have a cut-out, for example. Furthermore, the display region DA may have another polygonal shape or another shape, such as a circular or elliptic shape.

The display region DA is a region for displaying an image and overlaps the plurality of pixels Pix. The peripheral region BE is positioned inside the outer periphery of the array substrate SUB1 and outside the display region DA. The peripheral region BE may have a frame shape surrounding the display region DA. In this case, the peripheral region BE may be referred to as a frame region.

The first insulating substrate 10 of the array substrate SUB1 has a first side $10s1$, a second side $10s2$, a third side $10s3$, and a fourth side $10s4$. The first side $10s1$ extends along the first direction Dx in planar view. The second side $10s2$ is opposite to the first side $10s1$. The third side $10s3$ extends along the second direction Dy. The fourth side $10s4$ is opposite to the third side $10s3$.

The peripheral region BE is positioned between the edges of the first insulating substrate 10 and the display region DA. The peripheral region BE includes a first partial peripheral region sBE1, a second partial peripheral region sBE2, a third partial peripheral region sBE3, and a fourth partial peripheral region sBE4. The first partial peripheral region sBE1 according to the present embodiment is a region between the first side $10s1$ and a virtual line (indicated by the alternate long and two short dashes line) extending from the linear part of one of the long sides of the display region DA. The second partial peripheral region sBE2 is a region between the second side $10s2$ and a virtual line extending from the linear part of the other of the long sides of the display region DA. The third partial peripheral region sBE3 and the fourth partial peripheral region sBE4 are positioned between the first partial peripheral region sBE1 and the second partial peripheral region sBE2 and extend along the third side $10s3$ and the fourth side $10s4$, respectively.

The protrusion 10A is a part extending along the first side $10s1$ in the first partial peripheral region sBE1. The terminals T1 are disposed along the first side $10s1$ in the first partial peripheral region sBE1.

The peripheral region BE of the first insulating substrate 10 is provided with various kinds of wiring, such as connection lines 51 (also referred to as signal line coupling lines 51), signal output lines 52, drive signal supply lines 53, and guard wiring 54. The signal output lines 52 couple the terminals T1 and the signal line coupling lines 51. The signal output lines 52 are disposed obliquely with respect to the second direction Dy and output signals supplied from the driver IC 110 to the signal line coupling lines 51.

The signal line coupling lines (connection lines) 51 couple (connect) the terminals T1 and the signal lines SL (refer to FIG. 5) provided in the display region DA. The signal line coupling lines 51 are coupled to the signal output lines 52 and extend along the first direction Dx. A signal line coupling circuit, such as a multiplexer, which is not illustrated, is provided between the signal line coupling lines 51 and the signal lines SL.

The third partial peripheral region sBE3 and the fourth partial peripheral region sBE4 are each provided with a gate driver 13. The two gate drivers 13 are disposed along the second direction Dy. The gate driver 13 may be provided for only one of the third partial peripheral region sBE3 and the fourth partial peripheral region sBE4.

The drive signal supply lines 53 supply various control signals to the gate drivers 13. The drive signal supply lines 53 supply, for example, gate drive signals for driving the switching elements Tr to the gate drivers 13.

The guard wiring 54 is coupled to the terminals T1 and disposed continuously along the second partial peripheral region sBE2, the third partial peripheral region sBE3, and the fourth partial peripheral region sBE4 in a manner surrounding the display region DA. The guard wiring 54 is supplied with a reference potential having a constant potential. The reference potential is a ground potential, for example. The guard wiring 54 may partially have slits, thereby being divided into a plurality of parts.

Figure 3:
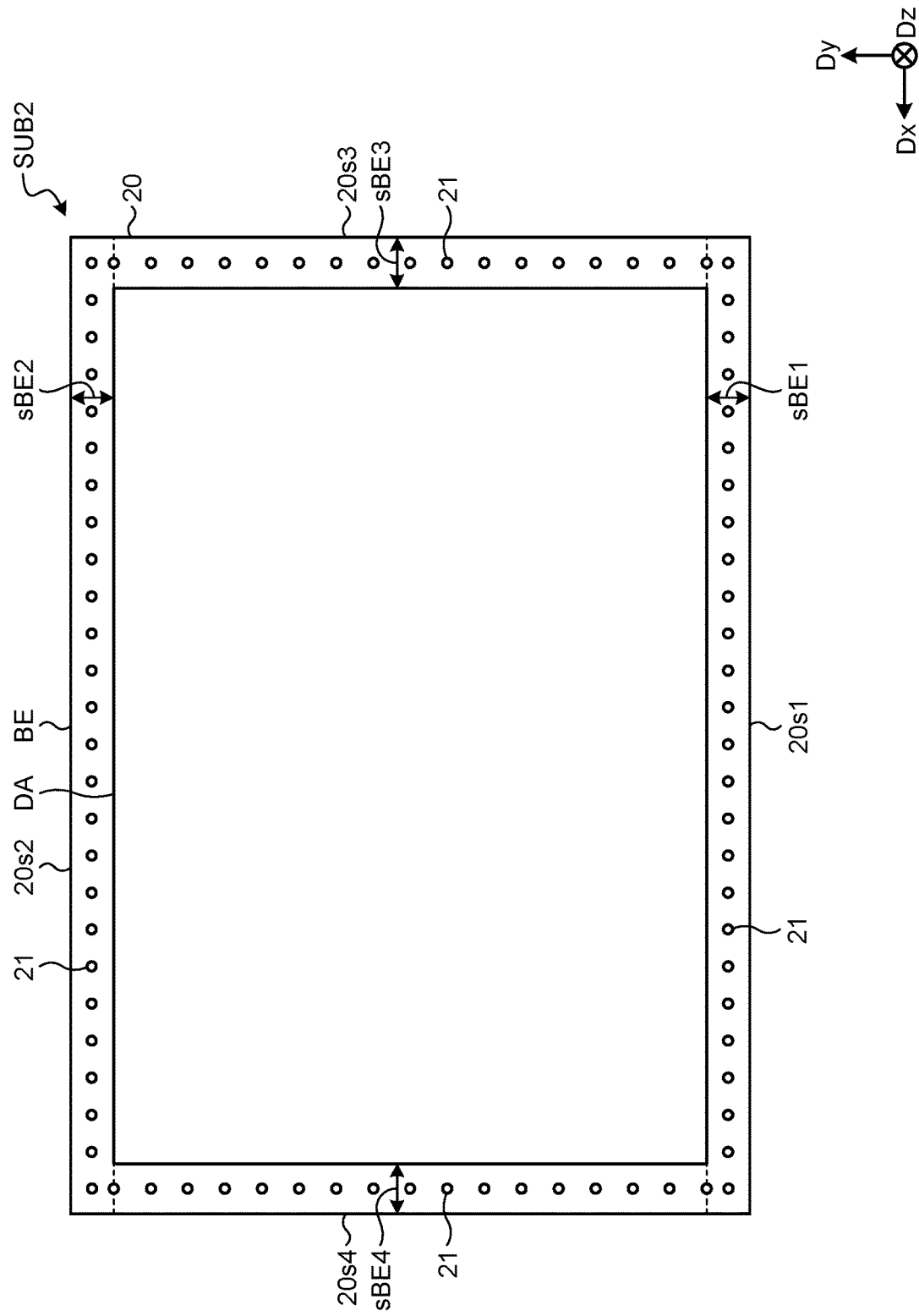
FIG. 3 is a plan view schematically illustrating a counter substrate.

FIG. 3 is a plan view schematically illustrating the counter substrate. As illustrated in FIG. 3, the counter substrate SUB2 includes the second insulating substrate 20 and spacers 21. FIG. 3 is a plan view viewed from a surface of the second insulating substrate 20 of the counter substrate SUB2 facing the first insulating substrate 10. In the same manner as the first insulating substrate 10, the second insulating substrate 20 has a first side 20s1, a second side 20s2, a third side 20s3, and a fourth side 20s4.

The spacers 21 are provided in the peripheral region BE of the second insulating substrate 20 in a manner surrounding the display region DA. Specifically, the spacers 21 are arranged along the first direction Dx in the first partial peripheral region sBE1 and the second partial peripheral region sBE2. The spacers 21 are arranged along the second direction Dy in the third partial peripheral region sBE3 and the fourth partial peripheral region sBE4.

FIG. 3 schematically illustrates the configuration to simplify the figure. The spacers 21 are arranged in the first direction Dx and the second direction Dy in the first partial peripheral region sBE1 to the fourth partial peripheral region sBE4.

Figure 4:
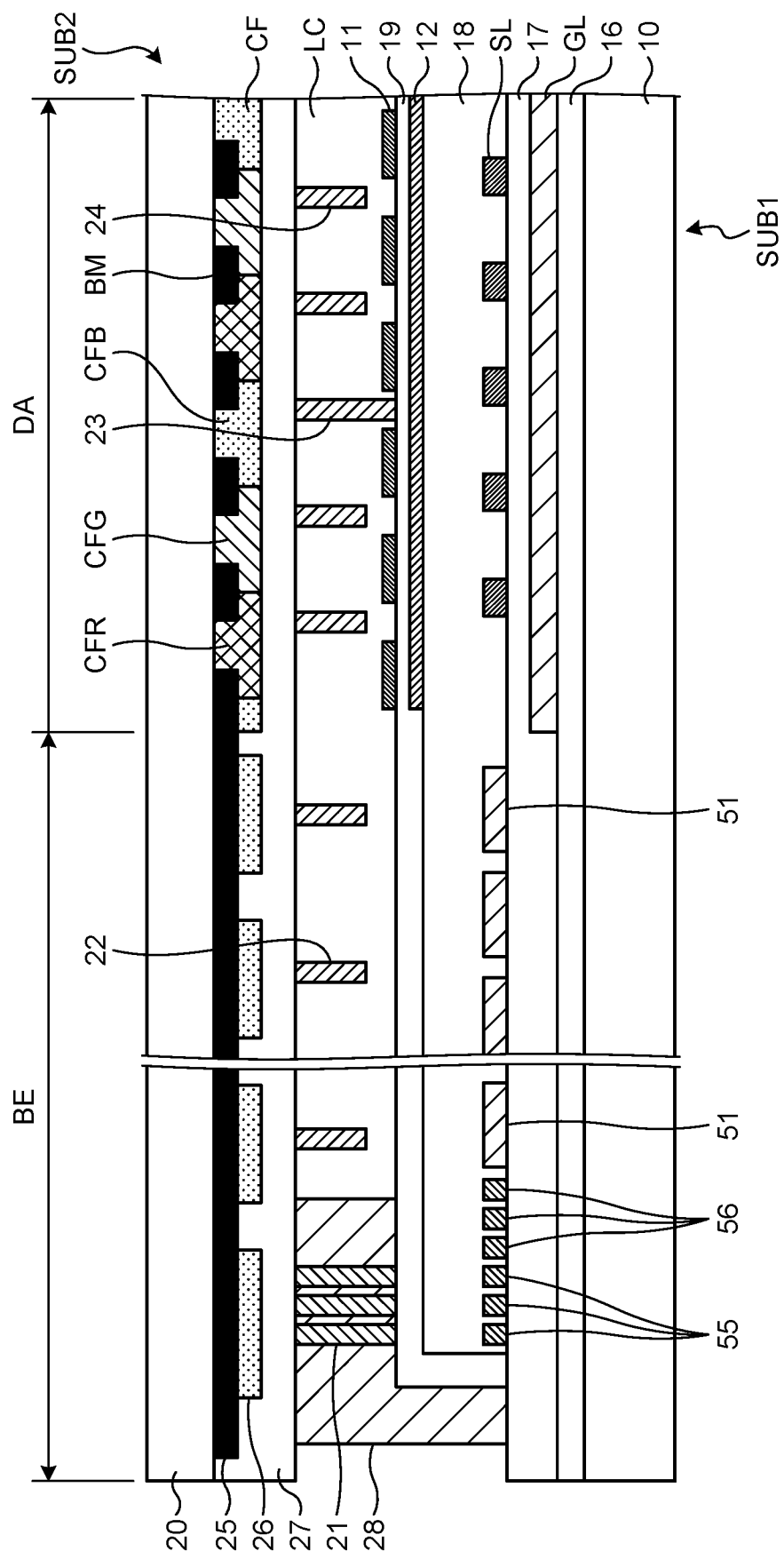
FIG. 4 is a sectional view of a schematic structure of the display device.

FIG. 4 is a sectional view of a schematic structure of the display device. FIG. 4 is a sectional view along line IV-IV' of FIG. 2. As illustrated in FIG. 4, the counter substrate SUB2 is disposed facing the array substrate SUB1 in a direction perpendicular to the surface of the array substrate SUB1. In the peripheral region BE, a sealing portion 28 is provided between the array substrate SUB1 and the counter substrate SUB2. The liquid crystal layer LC is provided in the space surrounded by the array substrate SUB1, the counter substrate SUB2, and the sealing portion 28.

The array substrate SUB1 includes the first insulating substrate 10, pixel electrodes 11, a common electrode 12, a first insulating film 16, a second insulating film 17, a third insulating film 18, a fourth insulating film 19, first dummy electrodes 55, second dummy electrodes 56, and various kinds of wiring, such as the signal lines SL, the scanning lines GL, and the signal line coupling lines 51.

In the present specification, a direction from the first insulating substrate 10 to the second insulating substrate 20 in the direction perpendicular to the first insulating substrate 10 is referred to as an "upper side" or simply referred to as "on". A direction from the second insulating substrate 20 to the first insulating substrate 10 is referred to as a "lower side" or simply referred to as "below". The "planar view" indicates the positional relation viewed from the direction perpendicular to the first insulating substrate 10.

The first insulating film 16 is provided on the first insulating substrate 10. The scanning lines GL are provided on the first insulating film 16. The second insulating film 17 is provided on the first insulating film 16 and covers the scanning lines GL. The signal lines SL are provided on the second insulating film 17. The first dummy electrodes 55, the second dummy electrodes 56, and the signal line coupling lines 51 are also provided on the second insulating film 17 in the same layer as the signal lines SL. The third insulating film 18 is provided on the second insulating film 17 and covers the signal lines SL, the first dummy electrodes 55, the second dummy electrodes 56, and the signal line coupling lines 51.

The common electrode 12 is provided on the third insulating film 18. The common electrode 12 is disposed continuously across the display region DA. The configuration is not limited thereto, and the common electrode 12 may have slits, thereby being divided into a plurality of parts. The common electrode 12 is covered with the fourth insulating film 19.

The pixel electrodes 11 are provided on the fourth insulating film 19 and face the common electrode 12 with the fourth insulating film 19 interposed therebetween. The pixel electrodes 11 and the common electrode 12 are made of translucent conductive material, such as indium tin oxide (ITO) and indium zinc oxide (IZO). The pixel electrodes 11 and the fourth insulating film 19 are covered with a first orientation film (not illustrated).

The first insulating film 16, the second insulating film 17, and the fourth insulating film 19 are made of translucent inorganic material, such as silicon oxide and silicon nitride. The third insulating film 18 is made of translucent resin material and has a greater thickness than the other insulating films made of inorganic material.

The counter substrate SUB2 includes the light-shielding layer BM, a light-shielding layer 25, the color filter CF, a colored layer 26, an overcoat layer 27, the spacers 21, sub-spacers 22, pixel spacers 23, and pixel sub-spacers 24 at a side of the second insulating substrate 20 facing the array substrate SUB1. The spacers 21, the sub-spacers 22, the pixel spacers 23, and the pixel sub-spacers 24 are provided between the first insulating substrate 10 and the second insulating substrate 20 in the direction perpendicular to the first insulating substrate 10 to define the cell gap.

In the display region DA, the light-shielding layer BM is positioned at the side of the second insulating substrate 20 facing the array substrate SUB1. The light-shielding layer BM defines openings facing the respective pixel electrodes 11. The pixel electrodes 11 are sectioned corresponding to the openings for the pixels Pix. The light-shielding layer BM is made of black resin material or light-shielding metal material.

The color filter CF includes color filters CFR, CFG, and CFB that pass light in different colors therethrough. The color filters CFR, CFG, and CFB are positioned at the side of the second insulating substrate 20 facing the array substrate SUB1. The end parts of the color filters CFR, CFG, and CFB overlap the light-shielding layer BM. The color filters CFR, CFG, and CFB are made of resin materials in red, green, and blue, respectively, for example.

In the peripheral region BE, the light-shielding layer 25 is positioned at the side of the second insulating substrate 20 facing the array substrate SUB1. The light-shielding layer 25 is disposed continuously in the region overlapping the various kinds of wiring, the first dummy electrodes 55, the second dummy electrodes 56, the spacers 21, and the sub-spacers 22 in the peripheral region BE. The light-shielding layer 25 is formed in the same layer and made of the same material as the light-shielding layer BM.

The colored layer 26 overlaps the light-shielding layer 25. The colored layer 26 is divided into a plurality of parts corresponding to the respective regions each overlapping the spacer 21 or the sub-spacer 22. The colored layer 26 may be disposed continuously in the peripheral region BE. The colored layer 26 is made of resin material colored in the same color as the color filter CF. The colored layer 26 is colored in the same color as the color filter CFB, which is blue, for example.

The overcoat layer 27 covers the color filters CFR, CFG, and CFB and the colored layer 26. The overcoat layer 27 is made of translucent resin material. The sealing portion 28 seals the space between the overcoat layer 27 of the counter substrate SUB2 and the second insulating film 17 and the fourth insulating film 19 of the array substrate SUB1.

In the display region DA, the pixel spacers 23 and the pixel sub-spacers 24 are provided to the overcoat layer 27. The pixel spacers 23 and the pixel sub-spacers 24 have a columnar shape and are provided for respective sub-pixels SPix (refer to FIG. 5). The pixel spacers 23 and the pixel sub-spacers 24 are provided in the respective regions overlapping the light-shielding layer BM in planar view. The upper end of the pixel spacer 23 is in contact with the overcoat layer 27, and the lower end thereof is in contact with the first orientation film. The height of the pixel sub-spacer 24 is lower than that of the pixel spacer 23. The lower end of the pixel sub-spacer 24 is separated from the first orientation film.

In the peripheral region BE, the spacers 21 and the sub-spacers 22 are provided to the overcoat layer 27. In other words, the light-shielding layer 25, the colored layer 26, the overcoat layer 27, and the spacers 21 and the sub-spacers 22 are layered in this order in the third direction Dz on the surface of the second insulating substrate 20 facing the first insulating substrate 10. The spacer 21 and the sub-spacer 22 have a columnar shape and have the same height as the pixel spacer 23 and the pixel sub-spacer 24, respectively.

The spacers 21 are provided in the region sealed by the sealing portion 28 and covered with the sealing portion 28. The spacers 21 are provided at positions overlapping the first dummy electrodes 55 in planar view. In other words, the first dummy electrodes 55 are provided between the first insulating substrate 10 and the spacers 21. The sub-spacers 22 are provided at positions overlapping the signal line coupling lines 51. The upper end of the spacer 21 is in contact with the overcoat layer 27, and the lower end thereof is in contact with the fourth insulating film 19. The height of the sub-spacer 22 is lower than that of the spacer 21. The lower end of the sub-spacer 22 is separated from the fourth insulating film 19.

The positions and the arrangement density of the spacers 21, the sub-spacers 22, the pixel spacers 23, and the pixel sub-spacers 24 may be appropriately modified. The counter substrate SUB2 may be provided with a second orientation film (not illustrated) covering the overcoat layer 27 and the spacers. The first orientation film and the second orientation film are made of horizontally oriented material, for example.

The array substrate SUB1 and the counter substrate SUB2 are disposed with the first orientation film and the second orientation film facing each other. The liquid crystal layer LC is sealed between the first orientation film and the second orientation film. The liquid crystal layer LC is made of negative liquid crystal material having negative dielectric anisotropy or positive liquid crystal material having positive dielectric anisotropy.

Let us assume a case where the liquid crystal layer LC is made of negative liquid crystal material, for example. When no voltage is applied to the liquid crystal layer LC, liquid crystal molecules included in the liquid crystal layer LC are initially oriented with their long axes along the first direction Dx in the X-Y plane. When a voltage is applied to the liquid crystal layer LC, that is, in an on-state where an electric field is formed between the pixel electrodes 11 and the common electrode 12, the liquid crystal molecules is affected by the electric field and the orientation thereof is changed. In the on-state, the linearly polarized light that enters the liquid crystal layer LC is changed in polarization depending on the orientation state of the liquid crystal molecules while the light is passing through the liquid crystal layer LC.

Figure 5:
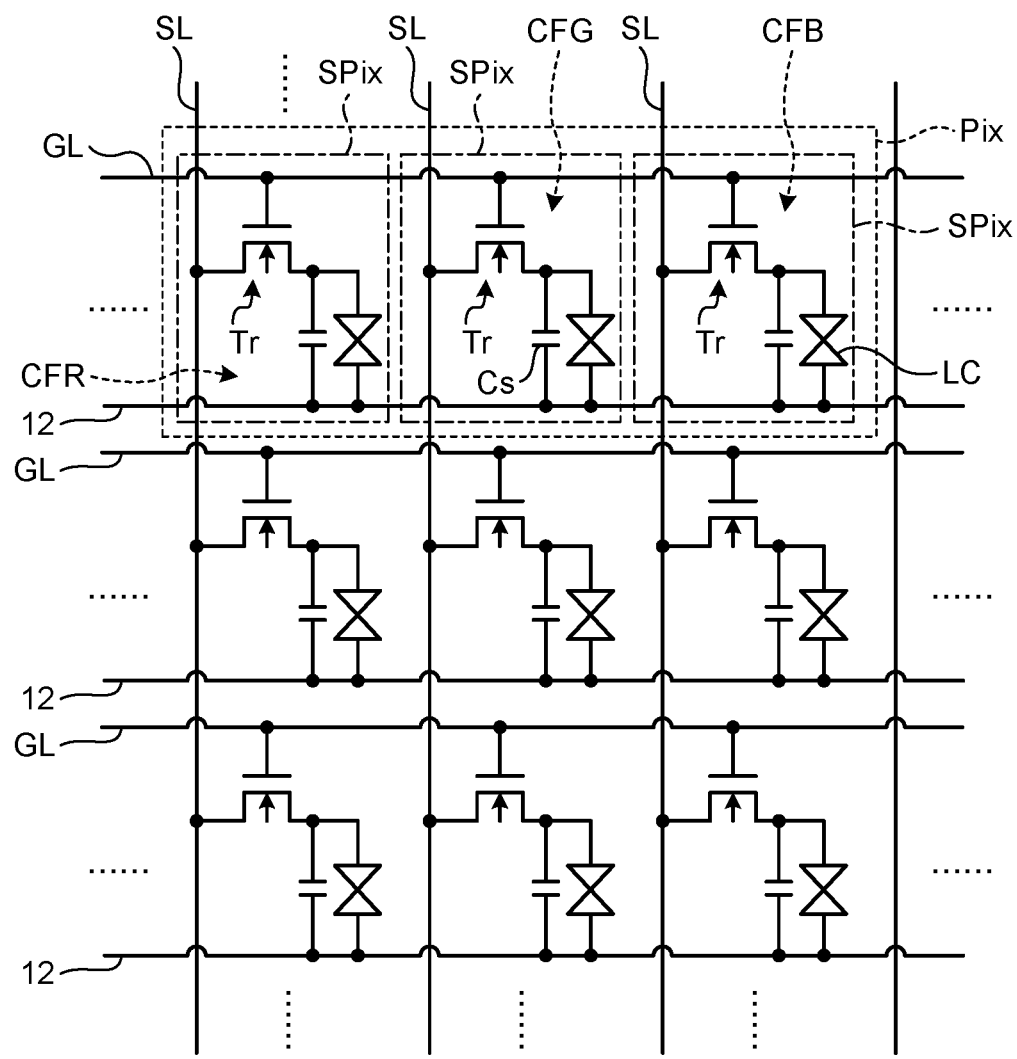
FIG. 5 is a circuit diagram of a pixel array in a display region.

FIG. 5 is a circuit diagram of a pixel array in the display region. The array substrate SUB1 is provided with the switching elements Tr of the respective sub-pixels SPix, the signal lines SL, the scanning lines GL, and other components illustrated in FIG. 5. The signal lines SL extend in the second direction Dy. The signal lines SL supply pixel signals to the pixel electrodes 11 (refer to FIG. 4). The scanning lines GL extend in the first direction Dx. The scanning lines GL supply drive signals (scanning signals) for driving the switching elements Tr.

The pixels Pix each include a plurality of sub-pixels SPix. The sub-pixels SPix each include the switching element Tr and capacitance of the liquid crystal layer LC. The switching element Tr is a thin-film transistor and is an n-channel metal oxide semiconductor (MOS) TFT in this example. The fourth insulating film 19 (refer to FIG. 4) is provided between the pixel electrodes 11 and the common electrode 12 illustrated in FIG. 4, thereby forming holding capacitance Cs illustrated in FIG. 5.

The color filters CFR, CFG, and CFB illustrated in FIG. 4 are cyclically arrayed color regions in three colors: red (R), green (G), and blue (B), for example. The color regions in the three colors: R, G, and B, serve as a set and correspond to the sub-pixels SPix. The set of the sub-pixels SPix corresponding to the color regions in the three colors serves as one pixel Pix. The color filters may include color regions in four or more colors. In this case, the pixels Pix may each include four or more sub-pixels SPix.

Figure 6:
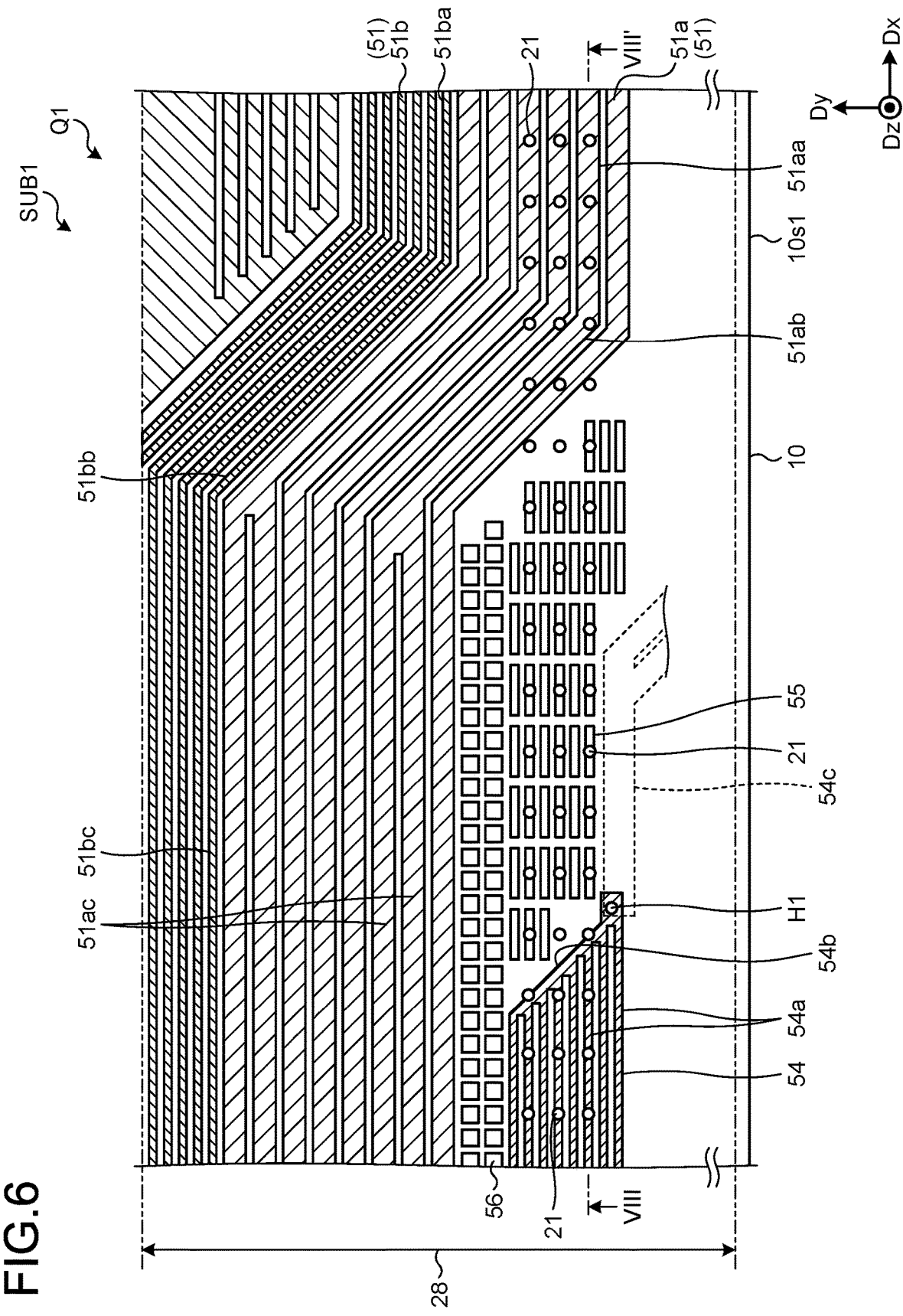
FIG. 6 is a partially enlarged view of a Q1 portion of FIG. 2.
Figure 7:
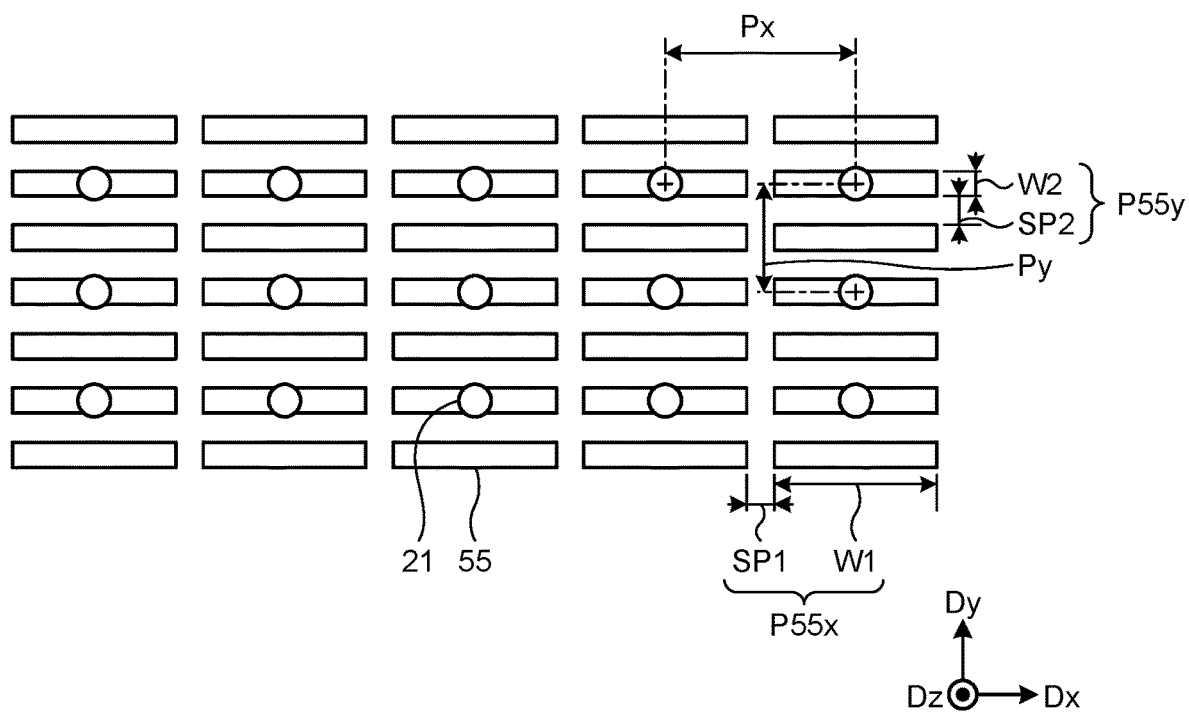
FIG. 7 is a plan view of the positional relation between first dummy electrodes and spacers in the Q1 portion.

The following describes the detailed configuration of the spacers 21, the first dummy electrodes 55, and the various kinds of wiring, such as the signal line coupling lines 51. FIG. 6 is a partially enlarged view of a Q1 portion of FIG. 2. FIG. 7 is a plan view of the positional relation between the first dummy electrodes and the spacers in the Q1 portion. FIG. 8 is a sectional view along line VIII-VIII' of FIG. 6. FIGS. 6 to 8 illustrate an exemplary configuration in the first partial peripheral region sBE1 provided with the terminals T1.

As illustrated in FIG. 6, the signal line coupling lines 51 includes a plurality of signal line coupling lines 51a and a plurality of signal line coupling lines 51b. The signal line coupling lines 51a are disposed closer to the first side 10s1 of the first insulating substrate 10 than the signal line coupling lines 51b. In other words, the signal line coupling lines 51a are coupled to the signal lines SL positioned farther away from the terminals T1 than the signal line coupling lines 51b. The width of the signal line coupling lines 51a in the second direction Dy is greater than that of the signal line coupling lines 51b in the second direction Dy. This structure can reduce the difference in resistance between the signal line coupling lines 51a and the signal line coupling lines 51b.

The signal line coupling lines 51a each include a first portion 51aa, a second portion 51ab, and a third portion 51ac. The first portion 51aa extends in the first direction Dx and is coupled to the terminal T1 via the signal output line 52 (refer to FIG. 2). The second portion 51ab is provided obliquely with respect to the first direction Dx and couples the first portion 51aa and the third portion 51ac. The third portion 51ac extends in the first direction Dx and is coupled to the signal line SL. The distance between the third portion 51*ac* and the first side 10*s*1 in the second direction Dy is greater than that between the first portion 51*aa* and the first side 10*s*1. In part of the signal line coupling lines 51*a*, one second portion 51*ab* is coupled to two third portions 51*ac* in a bifurcating manner.

In the same manner, the signal line coupling lines 51*b* each include a first portion 51*ba*, a second portion 51*bb*, and a third portion 51*bc*. The first portion 51*ba*, the second portion 51*bb*, and the third portion 51*bc* of the signal line coupling lines 51*b* are provided along the first portion 51*aa*, the second portion 51*ab*, and the third portion 51*ac* of the signal line coupling lines 51*a*, respectively. The numbers, the widths, the spaces, the shapes, and other elements of the signal line coupling lines 51*a* and the signal line coupling lines 51*b* are given by way of example only and may be appropriately modified.

The guard wiring 54 is provided between the third portion 51*ac* of the signal line coupling lines 51*a* and the first side 10*s*1. The guard wiring 54 includes a plurality of thin lines 54*a*, a coupling portion 54*b*, and coupling wiring 54*c*. The thin lines 54*a* extend in the first direction Dx and are arranged in the second direction Dy with a gap interposed therebetween. The coupling portion 54*b* couples the ends of the thin lines 54*a*. The coupling wiring 54*c* extends in the first direction Dx and is coupled to the terminals T1. The coupling wiring 54*c* is provided in a layer different from the layer of the thin lines 54*a* and the coupling portion 54*b*, for example, in the same layer as the scanning lines GL. The coupling wiring 54*c* is coupled to the thin lines 54*a* and the coupling portion 54*b* via a contact hole H1.

The first dummy electrodes 55 and the second dummy electrodes 56 are separated from the signal line coupling lines 51*a* and the guard wiring 54 in planar view and provided between the signal line coupling lines 51*a* and the guard wiring 54. In other words, the first dummy electrodes 55 and the second dummy electrodes 56 are provided in the region not overlapping the signal line coupling lines 51*a* or the guard wiring 54.

Specifically, the first dummy electrode 55 has a rectangular shape with its long side extending along the first direction Dx. The first dummy electrodes 55 are arrayed in the first direction Dx and the second direction Dy. The first dummy electrodes 55 are provided in the region between the second portions 51*ab* of the signal line coupling lines 51*a* and the coupling portion 54*b* of the guard wiring 54 adjacent in the first direction Dx. The first dummy electrodes 55 are provided between the third portions 51*ac* of the signal line coupling lines 51*a* and the first side 10*s*1 of the first insulating substrate 10 in the second direction Dy. More specifically, the first dummy electrodes 55 are provided in the region between the third portions 51*ac* of the signal line coupling lines 51*a* and the coupling wiring 54*c* of the guard wiring 54 adjacent in the second direction Dy.

The second dummy electrode 56 has a substantially square shape. The second dummy electrodes 56 are provided in the region between the third portions 51*ac* of the signal line coupling lines 51*a* and the thin lines 54*a* of the guard wiring 54 adjacent in the second direction Dy. The second dummy electrodes 56 are also provided in the region between the third portions 51*ac* of the signal line coupling lines 51*a* and the first dummy electrodes 55 adjacent in the second direction Dy. While the second dummy electrode 56 has a planar shape different from that of the first dummy electrode 55, it may have the same shape as the first dummy electrode 55.

The spacers 21 are arranged in the first direction Dx along the first side 10*s*1 and arranged in the second direction Dy in three rows. The spacers 21 may be arranged in the second direction Dy in four or more or two or less rows. The spacers 21 arranged in the first direction Dx overlap the first dummy electrodes 55, the signal line coupling lines 51*a*, and the guard wiring 54. In FIG. 6, the sealing portion 28 is indicated by the alternate long and two short dashes line, and the spacers 21 are disposed in the region provided with the sealing portion 28.

As illustrated in FIG. 7, an arrangement pitch Px of the spacers 21 in the first direction Dx is an integral multiple of an arrangement pitch P55*x* of the first dummy electrodes 55 in the first direction Dx. In the example illustrated in FIG. 7, the arrangement pitch Px of the spacers 21 is equal to the arrangement pitch P55*x* of the first dummy electrodes 55 in the first direction Dx. This configuration hinders positional deviation between the spacers 21 and the first dummy electrodes 55 in the first direction Dx. The spacers 21 overlap the respective first dummy electrodes 55 arranged in the first direction Dx.

An arrangement pitch Py of the spacers 21 in the second direction Dy is an integral multiple of an arrangement pitch P55*y* of the first dummy electrodes 55 in the second direction Dy. In the example illustrated in FIG. 7, the arrangement pitch Py of the spacers 21 is twice the arrangement pitch P55*y* of the first dummy electrodes 55. The spacers 21 arranged in the second direction Dy overlap every other first dummy electrode 55 arranged in the second direction Dy. In other words, the number of first dummy electrodes 55 arranged in the second direction Dy is equal to or greater than twice the number of spacers 21 arranged in the second direction Dy. This configuration hinders positional deviation between the spacers 21 and the first dummy electrodes 55 in the second direction Dy.

Each of the arrangement pitches Px and Py of the spacers 21 is a distance between the centers of gravity of the adjacent spacers 21 in planer view. Each of the arrangement pitches P55*x* and P55*y* of the first dummy electrodes 55 is a distance between the same sides of the adjacent first dummy electrodes 55. The arrangement pitch P55*x* of the first dummy electrodes 55 is the sum of a width W1 of the first dummy electrode 55 in the first direction Dx and a space SP1 between the first dummy electrodes 55 in the first direction Dx. The arrangement pitch P55*y* of the first dummy electrodes 55 is the sum of a width W2 of the first dummy electrode 55 in the second direction Dy and a space SP2 between the first dummy electrodes 55 in the second direction Dy.

The diameter of the spacer 21 according to the present embodiment is greater than the width W2 of the first dummy electrode 55. The width W2 of the first dummy electrode 55 is equal to the space SP2. The width W1 is approximately six times the space SP1. The shape of the first dummy electrode 55 may be appropriately modified. The width W2, for example, may be different from the space SP2. The width W1 may be five or less or seven or more times the space SP1. The diameter of the spacer 21 may be less than the width W2 of the first dummy electrode 55. While the spacer 21 has a cylindrical shape having a circular shape in planar view, it may have another shape, such as a rectangular or polygonal shape.

As illustrated in FIG. 6, the spacers 21 arranged in the first direction Dx overlap the first portion 51*aa* of the signal line coupling line 51*a* extending in the first direction Dx. The spacers 21 arranged in the second direction Dy overlap the respective first portions 51*aa* arranged in the second direction Dy. In other words, the arrangement pitch Py of the spacers 21 in the second direction Dy is an integral multiple of the arrangement pitch of the signal line coupling lines 51a in the second direction Dy. More preferably, the arrangement pitch Py of the spacers 21 is equal to the arrangement pitch of the signal line coupling lines 51a in the second direction Dy. This configuration can hinder positional deviation between the spacers 21 and the signal line coupling lines 51a in the second direction Dy.

In the same manner, the spacers 21 arranged in the first direction Dx overlap the thin line 54a of the guard wiring 54 extending in the first direction Dx. The spacers 21 arranged in the second direction Dy overlap every other thin line 54a arranged in the second direction Dy. In other words, the arrangement pitch Py of the spacers 21 in the second direction Dy is an integral multiple of the arrangement pitch of the thin lines 54a in the second direction Dy. In the example illustrated in FIG. 6, the arrangement pitch Py of the spacers 21 is twice the arrangement pitch of the thin lines 54a in the second direction Dy. The arrangement pitch of the thin lines 54a in the second direction Dy is equal to the arrangement pitch P55y of the first dummy electrodes 55.

As illustrated in FIG. 8, the first dummy electrodes 55, the signal line coupling lines 51a, and the guard wiring 54 are provided in the same layer on the second insulating film 17. The spacers 21 overlap the first dummy electrodes 55, the signal line coupling lines 51, and the guard wiring 54. In other words, the first dummy electrodes 55 are provided between the first insulating substrate 10 and the spacers 21 in the third direction Dz. More specifically, the first insulating substrate 10, the first insulating film 16, the second insulating film 17, the first dummy electrodes 55, the third insulating film 18, the fourth insulating film 19, the spacers 21, the overcoat layer 27, the colored layer 26, the light-shielding layer 25, and the second insulating substrate 20 are layered in this order in the region provided with the first dummy electrodes 55.

The signal line coupling lines 51a are provided between the first insulating substrate 10 and the spacers 21. More specifically, the first insulating substrate 10, the first insulating film 16, the second insulating film 17, the signal line coupling lines 51a, the third insulating film 18, the fourth insulating film 19, and the spacers 21 are layered in this order in the region provided with the signal line coupling lines 51a. The guard wiring 54 is provided between the first insulating substrate 10 and the spacers 21. More specifically, the first insulating substrate 10, the first insulating film 16, the second insulating film 17, the guard wiring 54, the third insulating film 18, the fourth insulating film 19, and the spacers 21 are layered in this order in the region provided with the guard wiring 54.

By providing the first dummy electrodes 55 in this manner, one metal layer (the first dummy electrodes 55, the signal line coupling lines 51, or the guard wiring 54) is provided between the spacers 21 and the first insulating substrate 10 in the region provided with the signal line coupling lines 51a and the guard wiring 54 and the region not provided with the signal line coupling lines 51a or the guard wiring 54. The positions and the arrangement pitch of the first portions 51aa of the signal line coupling lines 51a and the thin lines 54a of the guard wiring 54 are determined such that the spacers 21 overlap the first portions 51aa and the thin lines 54a. This configuration can hinder variation in the thickness from the first insulating substrate 10 to a surface of the fourth insulating film 19 at the positions provided with the spacers 21. Consequently, the display device 1 can hinder variation in the cell gap (distance between the first insulating substrate 10 and the second insulating substrate 20) in the first partial peripheral region sBE1 provided with the terminals T1 in the peripheral region BE.

Figure 9:
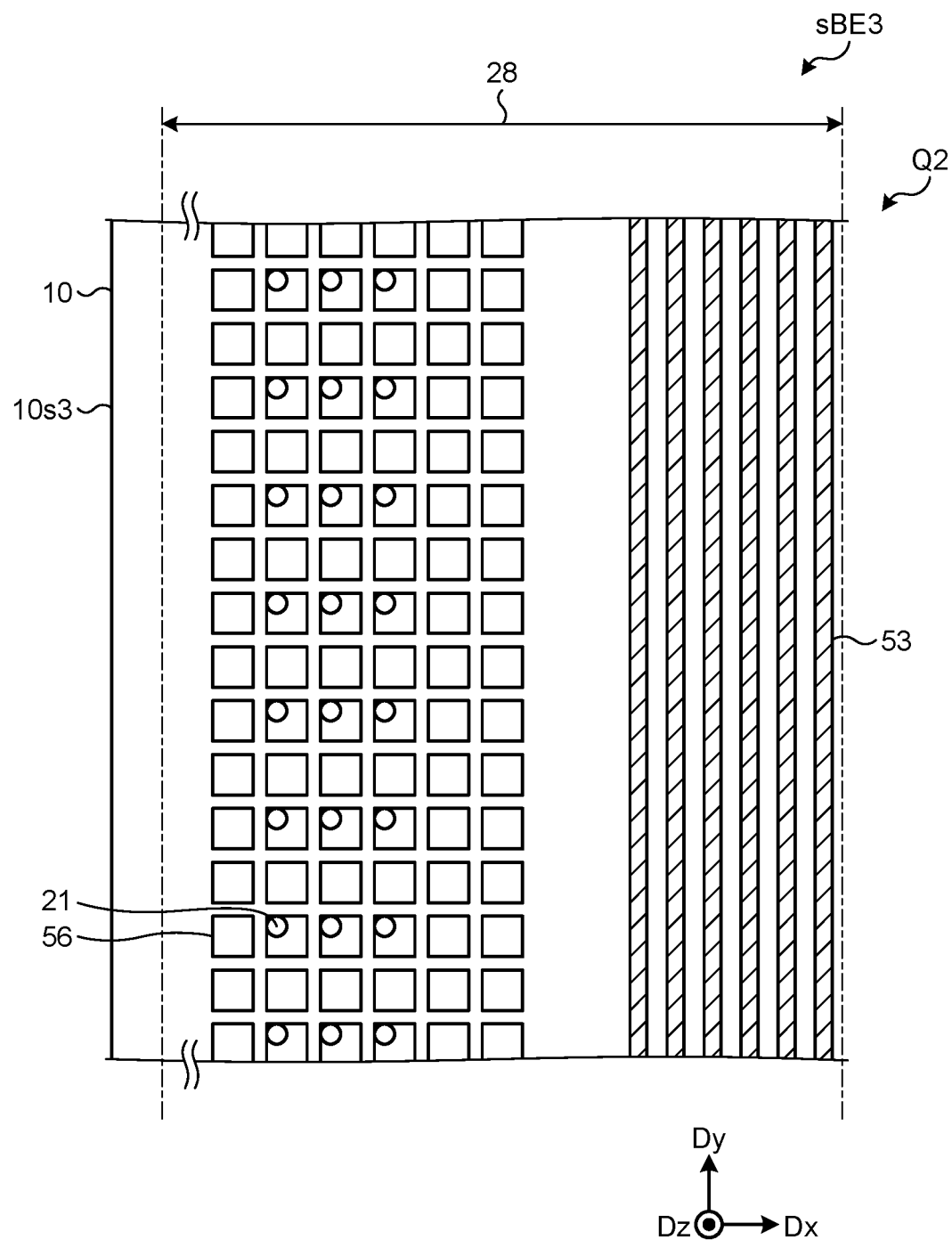
FIG. 9 is a partially enlarged view of a Q2 portion of FIG. 2.
Figure 10:
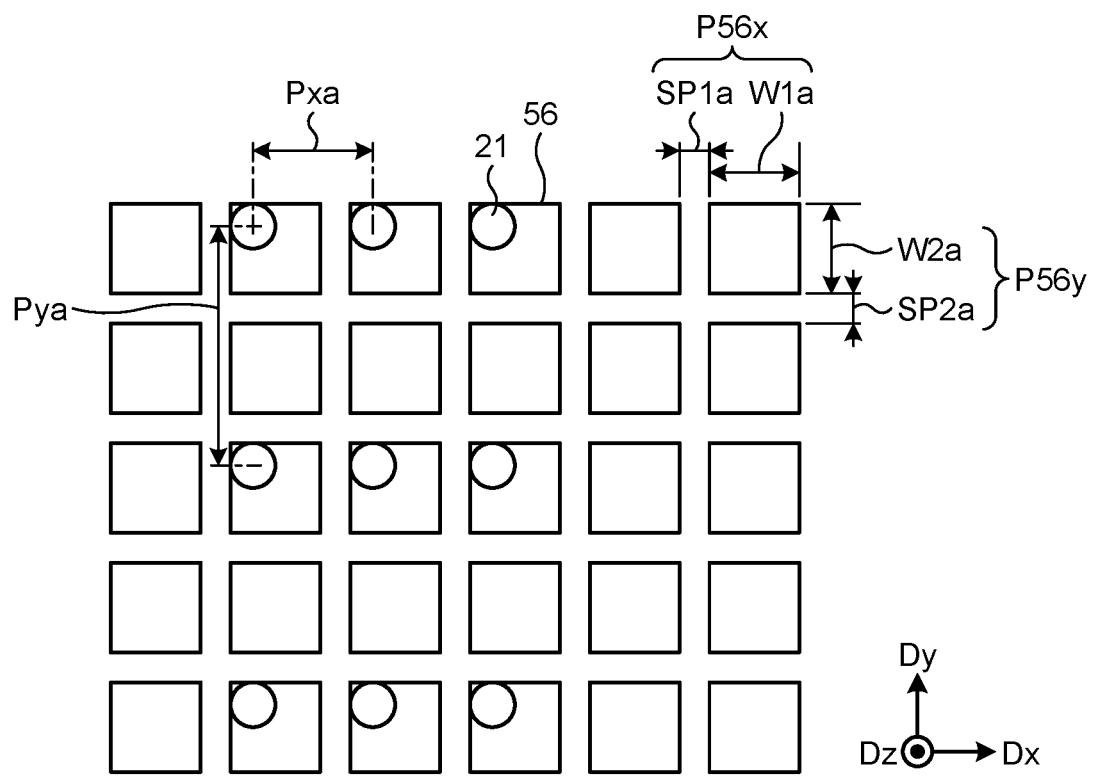
FIG. 10 is a plan view of the positional relation between second dummy electrodes and the spacers in the Q2 portion.

FIG. 9 is a partially enlarged view of a Q2 portion of FIG. 2. FIG. 10 is a plan view of the positional relation between the second dummy electrodes and the spacers in the Q2 portion. FIGS. 9 and 10 illustrate an exemplary configuration in the third partial peripheral region sBE3 not provided with the terminals T1. The explanation with reference to FIGS. 9 and 10 can be applied to the fourth partial peripheral region sBE4 illustrated in FIG. 2.

As illustrated in FIG. 9, the drive signal supply lines 53 extend in the second direction Dy and are arranged in the first direction Dx. The second dummy electrodes 56 are provided between the drive signal supply lines 53 and the third side 10s3 of the first insulating substrate 10. The second dummy electrodes 56 each have a substantially square shape and are arrayed in a matrix (row-column configuration).

The spacers 21 are arranged in the second direction Dy along the third side 10s3 and arranged in the first direction Dx in three columns. The spacers 21 may be arranged in the first direction Dx in four or more, or two or less columns. The spacers 21 overlap the second dummy electrodes 56.

As illustrated in FIG. 10, the spacers 21 arranged in the first direction Dx overlap three adjacent columns of the second dummy electrodes 56 out of six columns of the second dummy electrodes 56 arranged in the first direction Dx. An arrangement pitch Pxa of the spacers 21 in the first direction Dx is an integral multiple of an arrangement pitch P56x of the second dummy electrodes 56 in the first direction Dx. In the example illustrated in FIG. 10, the arrangement pitch Pxa is equal to the arrangement pitch P56x.

The spacers 21 arranged in the second direction Dy overlap every other second dummy electrode 56 arranged in the second direction Dy. An arrangement pitch Pya of the spacers 21 in the second direction Dy is an integral multiple of an arrangement pitch P56y of the second dummy electrodes 56 in the second direction Dy. In the example illustrated in FIG. 10, the arrangement pitch Pya is twice the arrangement pitch P56y. In other words, the number of second dummy electrodes 56 arranged in the second direction Dy is equal to or greater than twice the number of spacers 21 arranged in the second direction Dy.

The arrangement pitch P56x of the second dummy electrodes 56 is the sum of a width W1a of the second dummy electrode 56 in the first direction Dx and a space SP1a between the second dummy electrodes 56 in the first direction Dx. The arrangement pitch P56y of the second dummy electrodes 56 is the sum of a width W2a of the second dummy electrode 56 in the second direction Dy and a space SP2a between the second dummy electrodes 56 in the second direction Dy.

The diameter of the spacer 21 according to the present embodiment is less than the widths W1a and W2a of the second dummy electrode 56. The width W1a of the second dummy electrode 56 is equal to the width W2a thereof. The space SP1a is equal to the space SP2a. The widths W1a and W2a are approximately three times the spaces SP1a and SP2a, respectively.

The shape of the second dummy electrode 56 may be appropriately modified. The width W1a, for example, may not be equal to the width W2a, and the space SP1a may not be equal to the space SP2a. The widths W1a and W2a may be two or less or four or more times the spaces SP1a and SP2a.

As described above, the spacers 21 overlap the second dummy electrodes 56 also in the peripheral region BE not provided with the terminals T1. Consequently, the display device 1 can hinder variation in the cell gap between the first partial peripheral region sBE1 provided with the terminals T1 and the second partial peripheral region sBE2 to the fourth partial peripheral region sBE4 not provided with the terminals T1.

Figure 11:
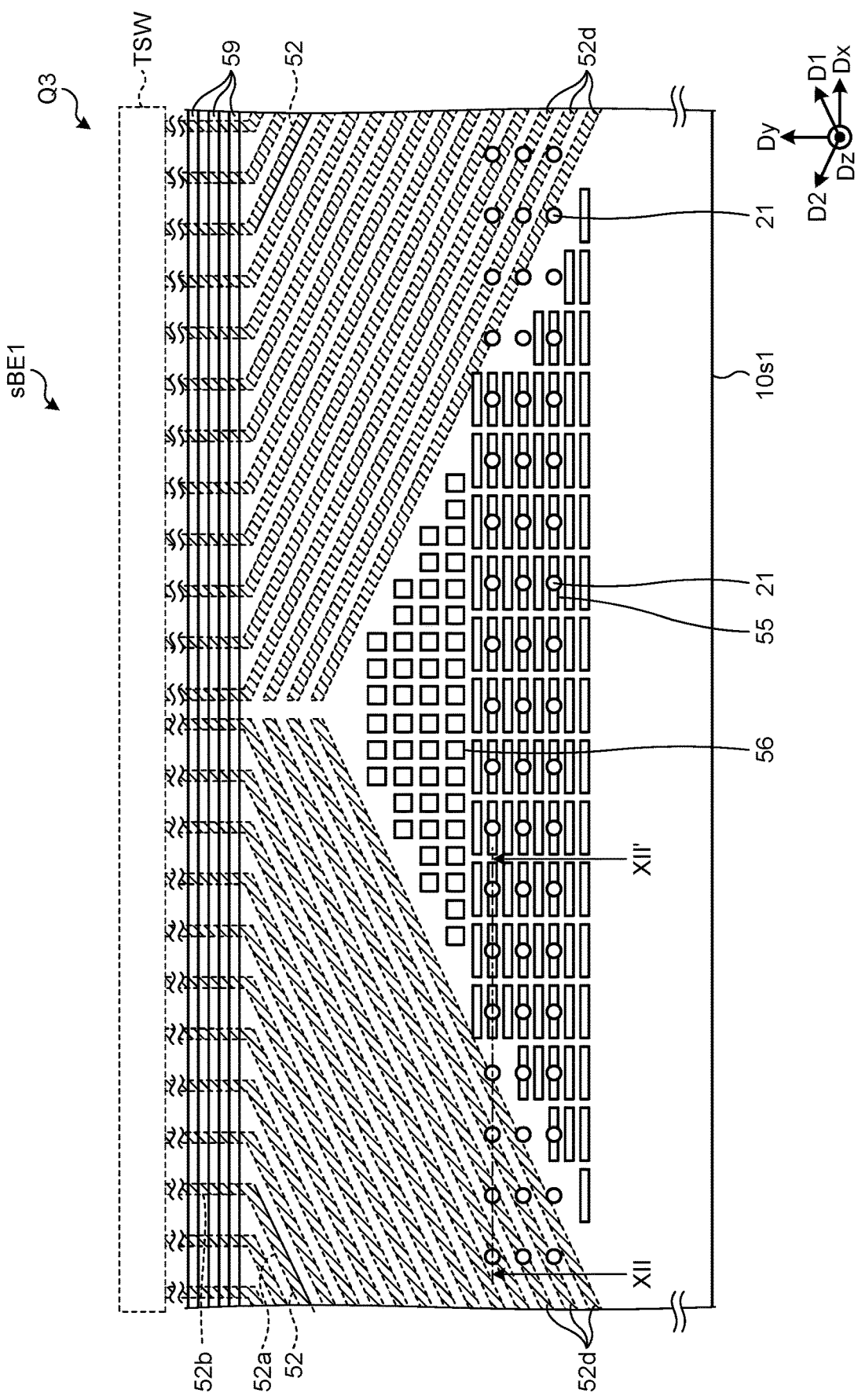
FIG. 11 is a partially enlarged view of a Q3 portion of FIG. 2.

FIG. 11 is a partially enlarged view of a Q3 portion of FIG. 2. FIG. 12 is a sectional view along line XII-XII' of FIG. 11. FIGS. 11 and 12 illustrate an exemplary configuration near the terminals T1 illustrated in FIG. 2.

As illustrated in FIG. 11, the signal output lines 52 each include an inclined portion 52a and a coupling portion 52b. The inclined portion 52a is extracted from the terminal T1 illustrated in FIG. 2 and extends in a direction inclined with respect to the second direction Dy. When the signal output lines 52 positioned at the left part of FIG. 11 is referred to as a first wiring group, the inclined portions 52a of the first wiring group extend in a direction D1 inclined with respect to the second direction Dy. When the signal output lines 52 positioned at the right part of FIG. 11 is referred to as a second wiring group, the inclined portions 52a of the second wiring group extend in a direction D2 opposite to the direction D1. The first wiring group and the second wiring group are provided symmetrically about a virtual line parallel to the second direction Dy.

The coupling portion 52b is coupled to the end of the inclined portion 52a on the side opposite to the first side 10s1. The coupling portion 52b extends in the second direction Dy and is coupled to the signal line coupling line 51 via a switching circuit TSW.

Control signal supply wiring 59 is provided intersecting the coupling portions 52b. The control signal supply wiring 59 supplies control signals for controlling the switching circuit TSW. The switching circuit TSW and the control signal supply wiring 59 are a circuit that switches between coupling and decoupling the signal output lines 52 and the signal line coupling lines 51 and is used as a circuit for inspecting the signal lines SL, for example. Detailed explanation of the configuration of the switching circuit TSW and the control signal supply wiring 59 is omitted. The switching circuit TSW and the control signal supply wiring 59 may be provided at different positions or are not necessarily provided.

A plurality of dummy lines 52d are provided along the inclined portions 52a of the signal output lines 52 and disposed between the signal output lines 52 and the first side 10s1. The dummy lines 52d are not coupled to the terminals T1 or the various kinds of wiring, such as the signal output lines 52 and the signal line coupling lines 51. The dummy lines 52d are not necessarily provided. In this case, the first dummy electrodes 55 and the second dummy electrodes 56 may be provided instead of the dummy lines 52d.

The first dummy electrodes 55 and the second dummy electrodes 56 are provided in the region surrounded by the signal output lines 52, the dummy lines 52d, and the edge of the first insulating substrate 10 (first side 10s1). In other words, the first dummy electrodes 55 and the second dummy electrodes 56 are provided in the region not overlapping the signal output lines 52 or the dummy lines 52d. The first dummy electrodes 55 and the second dummy electrodes 56 are arrayed in a substantially triangular shape as a whole along the inclination of the signal output lines 52 and the dummy lines 52d. The number of first dummy electrodes 55 arranged in the first direction Dx, for example, decreases away from the first side 10s1. The number of second dummy electrodes 56 decreases in the same manner as described above.

The spacers 21 overlap the first dummy electrodes 55, the signal output lines 52, and the dummy lines 52d. The positional relation between the spacers 21 and the first dummy electrodes 55 is the same as the configuration example illustrated in FIGS. 6 and 7. The signal output lines 52 and the dummy lines 52d are inclined with respect to the second direction Dy, and the gap between the signal output lines 52 and the gap between the dummy lines 52d are less than the diameter of the spacer 21. As a result, at least part of the spacers 21 overlap the signal output line 52 or the dummy line 52d.

As illustrated in FIG. 12, the signal output lines 52 and the dummy lines 52d are provided on the first insulating film 16. In other words, the signal output lines 52 and the dummy lines 52d are provided in the same layer as the scanning lines GL illustrated in FIG. 4 and in a layer different from the layer of the first dummy electrodes 55. The signal output lines 52, the dummy lines 52d, and the scanning lines GL are made of a first metal layer ML1. The first dummy electrodes 55, the second dummy electrodes 56, and the signal lines SL are made of a second metal layer ML2.

The signal output lines 52 are provided between the spacers 21 and the first insulating substrate 10 in the third direction Dz. More specifically, the first insulating substrate 10, the first insulating film 16, the signal output lines 52, the second insulating film 17, the third insulating film 18, the fourth insulating film 19, and the spacers 21 are layered in this order in the direction perpendicular to the first insulating substrate 10. The dummy lines 52d are provided between the spacers 21 and the first insulating substrate 10 in the third direction Dz. In the region not provided with the signal output lines 52 or the dummy lines 52d, the first dummy electrodes 55 are provided between the spacers 21 and the first insulating substrate 10. As a result, any one metal layer out of the first dummy electrodes 55, the signal output lines 52, and the dummy lines 52d is provided between the spacers 21 and the first insulating substrate 10. Consequently, the display device 1 can hinder variation in the cell gap in the region near the terminals T1.

Figure 13:
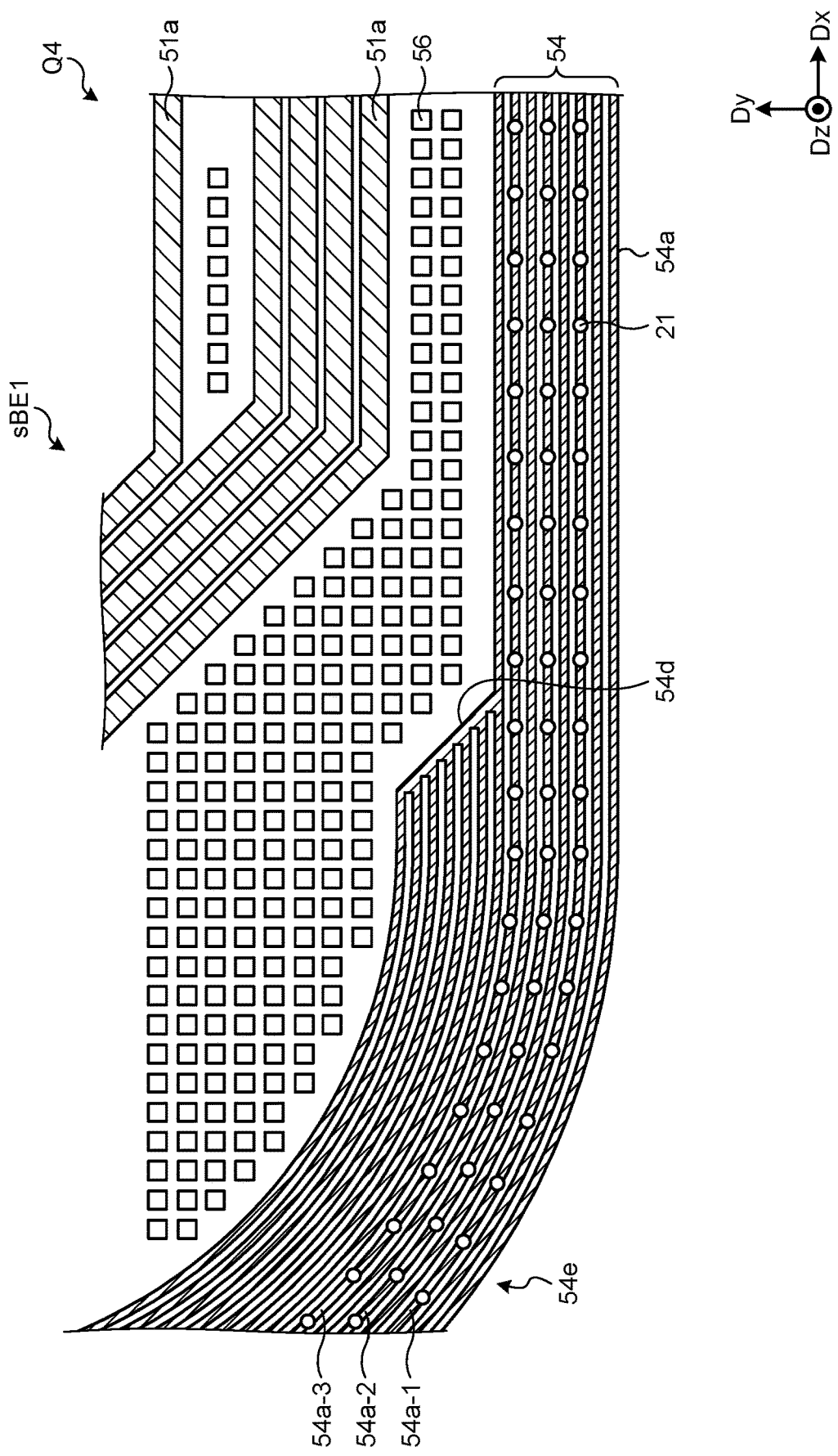
FIG. 13 is a partially enlarged view of a Q4 portion of FIG. 2.

FIG. 13 is a partially enlarged view of a Q4 portion of FIG. 2. FIG. 13 illustrates an exemplary configuration of a part near a corner of the peripheral region BE, that is, the first partial peripheral region sBE1 near the part where the first side 10s1 and the third side 10s3 are coupled in FIG. 2. As illustrated in FIG. 13, the Q4 portion has a smaller number of signal line coupling lines 51a than the Q1 portion illustrated in FIG. 6.

The guard wiring 54 has a curved line portion 54e corresponding to the corner of the peripheral region BE. The thin lines 54a included in the guard wiring 54 include part extending in the first direction Dx along the first side 10s1 and part extending in the second direction Dy along the third side 10s3 (refer to FIG. 2) that are coupled via the curved line portion 54e. The number of thin lines 54a in the curved line portion 54e is greater than that in the part extending in the first direction Dx. The thin lines 54a in the curved line portion 54e are coupled via the coupling portion 54d. The second dummy electrodes 56 are provided in the region between the signal line coupling lines 51a and the guard wiring 54.

The spacers 21 overlap the thin lines 54a of the guard wiring 54. The spacers 21 overlap three thin lines 54a-1, 54a-2, and 54a-3 arranged alternately out of the thin lines 54a. In the part of the thin lines 54a extending in the first direction Dx, the spacers 21 are arranged in the second direction Dy. The spacers 21 also overlap the curved line portion 54e and are arrayed along the curved line portion 54e. In the curved line portion 54e, the positions of the spacers 21 provided on the thin lines 54a-1, 54a-2, and 54a-3 are different in the first direction Dx. The sectional configuration at the part where the spacers 21 overlap the guard wiring 54 is the same as the configuration illustrated in FIG. 8.

With this configuration, the guard wiring 54 made of one metal layer (second metal layer ML2) is provided between the spacers 21 and the first insulating substrate 10 at the corner of the peripheral region BE. Consequently, the display device 1 can hinder variation in the cell gap in the region near the corner of the peripheral region BE. Furthermore, the display device 1 can hinder variation in the cell gap among the Q1 portion provided with a number of signal line coupling lines 51, the Q2 portion not provided with the terminals T1, and the Q3 portion provided with a number of signal output lines 52.

As described above, the display device 1 according to the embodiment includes a first substrate (first insulting substrate 10), a second substrate (second insulating substrate 20), the display region DA, the peripheral region BE, the scanning lines GL, the signal lines SL, the terminals T1, the signal line coupling lines 51, the spacers 21, and the dummy electrodes (first dummy electrodes 55). The second insulating substrate 20 faces the first insulating substrate 10. In the display region DA, the pixels Pix are provided on the first insulating substrate 10. The peripheral region BE is positioned between the edges of the first insulting substrate 10 and the display region DA. The scanning lines GL extend in the first direction Dx. The signal lines SL extend in the second direction Dy. The terminals T1 are arranged in the first direction Dx in the peripheral region BE of the first insulating substrate 10. The signal line coupling lines 51 couple the terminals T1 and the signal lines SL. The spacers 21 are provided between the first insulating substrate 10 and the second insulating substrate 20 in the direction perpendicular to the first insulating substrate 10. The dummy electrodes 55 are separated from the signal line coupling lines 51 in planar view and provided between the first insulating substrate 10 and the spacers 21 in the direction perpendicular to the first insulating substrate 10.

With this configuration, one metal layer (the first dummy electrodes 55 or the signal line coupling lines 51) is provided between the spacers 21 and the first insulating substrate 10 in the region provided with the signal line coupling lines 51 and the region not provided with the signal line coupling lines 51. This configuration can hinder variation in the thickness from the first insulating substrate 10 to the surface of the fourth insulating film 19 in contact with the spacers 21. Consequently, the display device 1 can hinder variation in the cell gap in the first partial peripheral region sBE1 provided with the terminals T1 in the peripheral region BE.

While exemplary embodiments according to the present disclosure have been described, the embodiments are not intended to limit the disclosure. The contents disclosed in the embodiments are given by way of example only, and various changes may be made without departing from the spirit of the present disclosure. Appropriate changes made without departing from the spirit of the present disclosure naturally fall within the technical scope of the disclosure. At least one of various omissions, substitutions, and changes of the components may be made without departing from the spirit of the embodiments above and modifications thereof.

What is claimed is:

1. A display device comprising:
a first substrate;
a second substrate facing the first substrate;
a display region in which a plurality of pixels are provided on the first substrate;
a peripheral region positioned between an edge of the first substrate and the display region;
a plurality of scanning lines extending in a first direction;
a plurality of signal lines extending in a second direction;
a plurality of terminals arranged in the first direction in the peripheral region of the first substrate;
a plurality of connection lines that connect the terminals and the signal lines, the connection lines being disposed in a first region;
a plurality of dummy electrodes disposed in a second region separated from the connection lines in planar view, and
a plurality of signal output lines that couple the terminals and the connection lines,
wherein
the dummy electrodes are provided in the second region surrounded by the end of the first substrate and the signal output lines.

2. The display device according to claim 1, further comprising a plurality of spacers provided between the first substrate and the second substrate in a direction perpendicular to the first substrate, wherein
the dummy electrodes are provided between the first substrate and the spacers in the direction perpendicular to the first substrate.

3. The display device according to claim 2, wherein
both the spacers and the dummy electrodes are arranged in the first direction, and
an arrangement pitch of the spacers in the first direction is an integral multiple of an arrangement pitch of the dummy electrodes in the first direction.

4. The display device according to claim 2, wherein
both the spacers and the dummy electrodes are arranged in the second direction, and
an arrangement pitch of the spacers in the second direction is an integral multiple of an arrangement pitch of the dummy electrodes in the second direction.

5. The display device according to claim 2, wherein
the spacers overlap the connection lines in the first region different from the second region, and
an arrangement pitch of the spacers in the second direction is an integral multiple of an arrangement pitch of the connection lines in the second direction.

6. The display device according to claim 1, wherein
the connection lines extend in the first direction, and
the dummy electrodes are provided between the connection lines and the edge of the first substrate in the second direction.

7. The display device according to claim 1, further comprising:
a first insulating film provided between the first substrate and the scanning lines; and
a second insulating film provided between the scanning lines and the signal lines, wherein
the dummy electrodes and the connection lines are provided in the same layer as the signal lines, and
the first substrate, the first insulating film, the second insulating film, the dummy electrodes, and the second substrate are layered in order in the direction perpendicular to the first substrate.

8. The display device according to claim 2, further comprising:
- guard wiring provided in a third region between the connection lines and the edge of the first substrate and supplied with a reference potential, wherein
- the spacers overlap the guard wiring in the third region that is different from the first region and the second region.

9. The display device according to claim 8, wherein
the guard wiring includes a plurality of thin lines,
the thin lines are arranged in the second direction and electrically coupled to one another, and
an arrangement pitch of the spacers in the second direction is an integral multiple of an arrangement pitch of the thin lines in the second direction.

10. The display device according to claim 8, wherein
the dummy electrodes are provided between the guard wiring and the connection lines in the first direction, and
the spacers arranged in the first direction overlap the dummy electrodes in the second region, the guard wiring in the third region, and the connection lines in the first region.

11. A display device comprising:
- a first substrate;
- a second substrate facing the first substrate;
- a display region in which a plurality of pixels are provided on the first substrate;
- a peripheral region positioned between an edge of the first substrate and the display region;
- a plurality of scanning lines extending in a first direction;
- a plurality of signal lines extending in a second direction;
- a plurality of terminals arranged in the first direction in the peripheral region of the first substrate;
- a plurality of connection lines that connect the terminals and the signal lines, the connection lines being disposed in a first region;
- guard wiring provided in a third region between the connection lines and the edge of the first substrate and supplied with a reference potential; and
- a plurality of dummy electrodes disposed in a second region between the connection lines and the guard wiring in planar view, wherein
the plurality of dummy electrodes has first dummy electrodes and second dummy electrodes,
the first dummy electrodes and the second dummy electrodes are separated from the connection lines and the guard wiring in planar view,
the first dummy electrodes are disposed between the second dummy electrodes and the guard wiring in planar view, and
the second dummy are disposed between the connection lines and the first dummy electrodes in planar view.

12. The display device according to claim 11, further comprising a plurality of spacers provided between the first substrate and the second substrate in a direction perpendicular to the first substrate, wherein
the dummy electrodes are provided between the first substrate and the spacers in the direction perpendicular to the first substrate.

13. The display device according to claim 12, wherein
the guard wiring includes a plurality of thin lines,
the thin lines are arranged in the second direction and electrically coupled to one another, and
an arrangement pitch of the spacers in the second direction is an integral multiple of an arrangement pitch of the thin lines in the second direction.

14. The display device according to claim 12, wherein
the dummy electrodes are provided in the second region between the guard wiring and the connection lines in the first direction, and
the spacers arranged in the first direction overlap the dummy electrodes in the second region, the guard wiring in the third region, and the connection lines in the first region.

15. The display device according to claim 12, wherein
both the spacers and the dummy electrodes are arranged in the first direction, and
an arrangement pitch of the spacers in the first direction is an integral multiple of an arrangement pitch of the dummy electrodes in the first direction.

16. The display device according to claim 12, wherein
both the spacers and the dummy electrodes are arranged in the second direction, and
an arrangement pitch of the spacers in the second direction is an integral multiple of an arrangement pitch of the dummy electrodes in the second direction.

17. The display device according to claim 12, wherein
the spacers overlap the connection lines in the first region different from the second region, and
an arrangement pitch of the spacers in the second direction is an integral multiple of an arrangement pitch of the connection lines in the second direction.

18. The display device according to claim 11, wherein
a width in the first direction of the first dummy electrodes is greater than a width in the first direction of the second dummy electrodes in planar view.

19. The display device according to claim 11, wherein
a width in the second direction of the second dummy electrodes is greater than a width in the second direction of the first dummy electrodes in planar view.

* * * * *